J. A. KNAPP.
TAKE-UP DEVICE FOR LAMP CORDS.
APPLICATION FILED JAN. 8, 1917.
1,230,414.
Patented June 19, 1917.
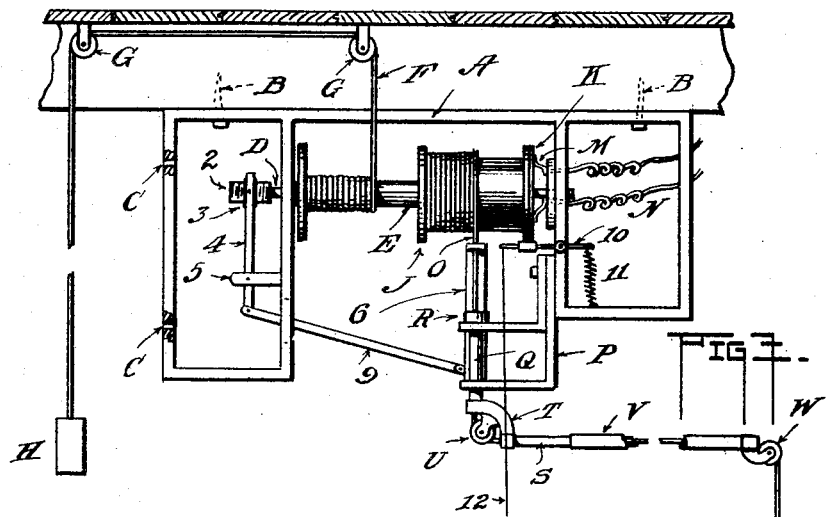
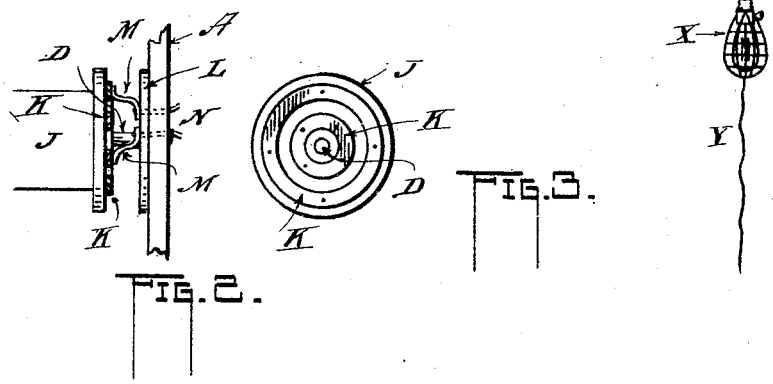
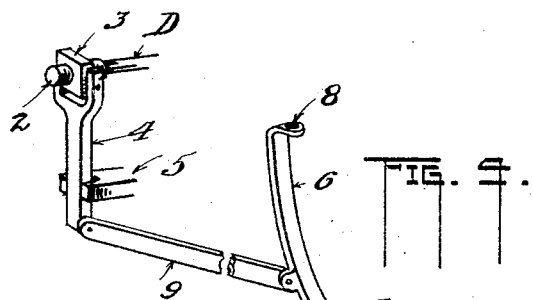
Witnesses:
Marie Dacey
Louise H. March
Inventor
Jacob A. Knapp,
By
Atty.

UNITED STATES PATENT OFFICE.

JACOB A. KNAPP, OF TREMONT, ILLINOIS.

TAKE-UP DEVICE FOR LAMP-CORDS.

1,230,414.  Specification of Letters Patent.  Patented June 19, 1917.

Application filed January 8, 1917. Serial No. 141,300.

*To all whom it may concern:*

Be it known that JACOB A. KNAPP, citizen of the United States, residing at Tremont, in the county of Tazewell and State of Illinois, has invented certain new and useful Improvements in Take-up Devices for Lamp-Cords; and he does hereby declare that the following is a full, clear, and exact description of the invention, which will enable others skilled in the art to which it appertains to make and use the same.

This invention relates to a balanced take-up device for electric lamp cords. It relates more particularly to a balanced take-up device for installation in garages and other places where portable electric lamps are carried about at long distances from the current carrying wires. In making repairs to vehicles or washing them the electric lamp cord is usually drawn about the floor and subjected to abuse such that accidents and fires are often the result and it is my purpose to furnish an overhead reel for automatically taking up the lamp cord and permitting it to "pay out" as required, the cord being suspended so that it is entirely out of the way of the worker and in no danger of harming persons or being itself broken or damaged.

The primary object of the invention is to attach to a convenient overhead support a take-up device above or over the position where the automobile is washed or repaired, the same including a swinging arm from the end of which the lamp and its cord is suspended so that said lamp can be carried entirely around the vehicle, its cord being drawn from the said arm to any desired distance but which can be taken up as desired.

Another object is to include with a device of this character means for causing the cord to wrap smoothly upon its take-up drum or spool.

Other objects and advantages will appear as the description proceeds, and in order that the invention may be fully understood, I have provided the accompanying drawing, in which, Figure 1 is an elevation of my invention suspended from the beam of a ceiling, for example.

Fig. 2 is an enlarged detail of certain electric current carrying parts.

Fig. 3 is an end elevation of a reel or drum showing a pair of concentric rings; and, Fig. 4 shows, in perspective, parts of a mechanism shown in Fig. 1.

In shops and garages, and many other places, it is customary to make use of a long electric lamp cord extending from wiring carried along the ceiling, the cord being allowed to trail over the floor or over machinery and in constant danger of being broken and causing accidents.

I am aware that certain devices have been patented with a view to controlling the lamp cord but they have not been so constructed as to provide the required conveniences and advantages, and do not admit of extending the lamp to considerable distances and properly suspending it out of the way, nor are the take-up portions thereof of the proper structure to produce the best results in practice.

My device consists of a suitable light metal frame A which may be suspended from a ceiling by means of bolts B, for example, or it may be attached at its side to an upright, such as a post, by suitable bolts that may pass through holes C, Fig. 1.

D is a shaft journaled at its ends in the frame A, there being secured to it a drum E upon which is wrapped a cable F extending over pulleys G, the end of the cord carrying a weight H. Secured on the shaft is a drum or spool J which may be a part of the drum E. Secured to said drum J is a pair of spaced concentric metal rings K, and attached to the frame is an insulating member L to which is secured two contact springs M, each bearing on one of the rings and connected to current conducting wires N.

O indicates an electric lamp cord wound upon the drum whose terminals at one end are suitably connected to the rings K. P is a bracket suspended from the frame A and extending to about the middle of the length of the drum J. Q is a short pipe carried in the bracket in a vertical position and provided with a head R resting upon said bracket and arranged to rotate thereon. Attached to its lower end is a horizontally disposed pipe S, its means of attachment being through a casting T in which is mounted a pulley U. V is a pipe adapted to slide upon the pipe S and carrying at its free end a roller W. The cord O passes through the pipes Q S and V and is trained over the pulleys U W and carries a lamp X suspended from which is a cord Y for convenience.

One end of the shaft D is provided with a worm 2 and engaging the same is a nut 3. 4 is a lever pivoted on an arm 5 of the frame A. 6 is an arm pivoted at one end to an ear 7 of the bracket P, its upper end having an opening 8 through which the cord O extends. 9 is a link connecting the arm 6 with the lever 4.

If desired a brake may be employed. An arm 10 is provided on some convenient part of the frame A, for example. One end may have contact with the flange of one of the drums and a spring 11 connecting the arm and the frame serves to hold the said arm in constant frictional engagement with said flange. A cord 12 in reach of the operator serves to release the drum when desired. The brake mechanism may be used where it may be the desire to have the weight of greater weight than would otherwise be provided in order to take up the cord more rapidly.

In using the device the arm V S may be extended to any desired distance by drawing out the portion V, the cable F and the cord O being wound upon their respective drums so that in drawing out the cord O the weight will be raised by winding up the cable F. Contrariwise, by raising the lamp and its cord the weight will fall and take up the cord.

The pitch of the threads of the worm 2 and the relation of the lever 4 to the arm 6 is such that as the weight falls the upper end of the lever D will be moved to the left by the threads of the worm 2, its end being moved toward the right, as viewed in Fig. 1, thereby causing the arm 6 to move at proper speed to guide the cord O upon the drum J in a smooth wrapping from end to end, the diameter and length of the said drum being such as to accommodate a length of cord found necessary for any given installation.

When the cord is drawn off the drum the worm will cause the arm 6 to travel along with the unwinding cord in an automatic manner without any likelihood of the cord catching or wearing unnecessarily.

The telescoping arms S V can be extended as far as desired and an area of many feet in diameter may thus be covered. By being enabled to wind the cord smoothly upon the drum there is little likelihood of its becoming twisted or tangled or of so placing itself as to cause the device to halt in the "take-up" action. Although the arm S V may be turned around and around on its support and the cord may be thus twisted throughout its length, as it is alternately wound up and drawn off it will untwist as it passes over the rollers and keep itself straightened.

A weight is preferred to a spring from the fact that it maintains a constant and even pull on the lamp cord whereas a spring would constantly change in tension as the cord is drawn out and the longest draw of the cord would either place the spring under too great tension and thus cause it to react, or it would have to be adjusted in the long draw of the cord so as not to react and thus be so weak that it would not wind up all of the cord in the take-up action.

A weight is constant and will take up all of the cord and will not react when the cord is drawn out to its limit. Should the lamp be suspended so high as to be out of reach the cord Y is provided for drawing it down within reach.

Having thus described my invention, I claim:—

1. The combination with a suitable supporting frame for attachment to a support, of a drum rotatably mounted on the frame, a cable arranged to wind upon the drum, and including a weight, an arm having a permanent substantially horizontal position supported opposite said drum, and adapted to swing, a lamp cord arranged to wind on the drum and including a lamp, and means for conducting an electric current to said cord.

2. The combination with a suitable supporting frame for attachment to a support, of a winding drum rotatably mounted thereon, a cable arranged to wind upon the drum, a lamp cord also arranged to wind upon the drum, an extensible arm suspended beneath the drum and arranged in a permanent substantially horizontal position and adapted to swing, electric connections on the drum connected with the terminals of the cord on said drum, and current conducting members adapted for slidable engagement therewith.

3. In combination with a suitable frame, a drum rotatably mounted on the same, a cable adapted to wind upon the same, including a weight, an arm disposed permanently in a substantially horizontal position suspended on the frame with one terminal opposite the drum and adapted to swing and including a tubular vertical extension constituting a support for the arm, a lamp cord extending through said vertical extension and extending along the arm and arranged to wind upon the drum, and connections on said drum for conducting current to the cord at its end on the drum.

4. The combination with a suitable frame, of a drum rotatably mounted thereon, a cable arranged to wind thereon including a weight, a lamp cord also arranged to wind upon the drum, and mechanism in control of the cord and operated by the drum in its rotation adapted to guide the said cord upon the drum whereby to dispose the same in an even winding on said drum.

5. The combination with a suitable supporting frame, of a drum rotatably mounted thereon, a cable arranged to wind upon the drum and including a weight, a lamp cord also adapted to wind upon the drum and having its terminals electrically connected with an electric circuit, an arm having an opening through which the cord extends, said arm adapted to be moved to guide the cord in even winding upon the drum, and mechanism including gearing operated by the drum and having connection with said arm and adapted in the rotation of the drum to move the arm.

6. The combination with a suitable supporting frame, of a drum rotatably mounted thereon, a cable arranged to wind upon the drum and including a weight, a lamp cord also adapted to wind upon the drum and having terminals electrically connected with an electric circuit, an arm having an opening through which the cord extends, said arm adapted to be moved to guide the cord in even winding upon the drum, mechanism including gearing operated by the drum, having connection with said arm and adapted in the rotation of the drum to move the arm, and an arm supported on the frame and adapted to swing and having the lamp cord extending through the same.

7. The combination of a frame, a drum rotatably mounted thereon, a cable arranged to be wound upon the drum and including a weight, a lamp cord also arranged to be wound upon the drum by the weight, electrical connections for said cord at said drum, a brake normally in engagement with the drum, means for manually operating the same to release the drum, and an arm having a permanent substantially horizontal position over which the cord extends.

In testimony whereof I affix my signature, in presence of two witnesses.

JACOB A. KNAPP.

Witnesses:
 JACOB VILDER,
 L. E. BENNETT.

Copies of this patent may be obtained for five cents each, by addressing the "Commissioner of Patents, Washington, D. C."